(12) United States Patent
Ogata et al.

(10) Patent No.: US 9,400,113 B2
(45) Date of Patent: Jul. 26, 2016

(54) MULTIFUEL GAS TURBINE COMBUSTOR

(71) Applicant: KAWASAKI JUKOGYO KABUSHIKI KAISHA, Kobe-shi, Hyogo (JP)

(72) Inventors: Masahiro Ogata, Kobe (JP); Takeo Oda, Kobe (JP); Yasuhiro Kinoshita, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/421,065

(22) PCT Filed: Jun. 12, 2014

(86) PCT No.: PCT/JP2014/065657
§ 371 (c)(1),
(2) Date: Feb. 11, 2015

(87) PCT Pub. No.: WO2015/037295
PCT Pub. Date: Mar. 19, 2015

(65) Prior Publication Data
US 2016/0033131 A1 Feb. 4, 2016

(51) Int. Cl.
*F23R 3/34* (2006.01)
*F23R 3/28* (2006.01)
(Continued)

(52) U.S. Cl.
CPC . *F23R 3/286* (2013.01); *F02C 3/22* (2013.01); *F02C 7/222* (2013.01); *F02C 7/232* (2013.01);
(Continued)

(58) Field of Classification Search
CPC .............. F23R 3/34; F23R 3/36; F23R 3/346; F23R 3/286; F02C 3/22
See application file for complete search history.

(56) References Cited

U.S. PATENT DOCUMENTS 6,237,343 B1  5/2001  Butler
8,607,572 B2  12/2013  Koizumi et al.
(Continued)

FOREIGN PATENT DOCUMENTS

CN  101726004 A  6/2010
CN  102032568 A  4/2011
(Continued)

OTHER PUBLICATIONS

Communication dated Apr. 2, 2015, issued by the Canadian Intellectual Property Office in counterpart Canadian application No. 2,885,287.
(Continued)

*Primary Examiner* — Phutthiwat Wongwian
*Assistant Examiner* — Marc Amar
(74) *Attorney, Agent, or Firm* — Sughrue Mion, PLLC

(57) ABSTRACT

To provide a multifuel gas turbine combustor capable of combusting gases containing hydrogen in a high concentration with a low NOx while maintaining a low emission performance brought about by the pre-mixture combustion in the main burner, the gas turbine combustor includes a main burner (12) for supplying to and combusting a premixed gas (M), containing a first fuel (F1), within a first combustion region (S1) of a combustion chamber (10), and a supplemental burner (20) for supplying to and combusting a second fuel (F2) of a composition different from that of the first fuel (F1) within a second combustion region (S2) defined downstream of the first combustion region (S1) within the combustion chamber (10). The first fuel (F1) is of a hydrocarbon system and the second fuel (F2) is a gas containing hydrogen in a concentration exceeding the stable combustion limiting concentration of the hydrogen.

4 Claims, 7 Drawing Sheets

(51) Int. Cl.
    *F23R 3/36* (2006.01)
    *F23R 3/46* (2006.01)
    *F02C 7/22* (2006.01)
    *F02C 7/232* (2006.01)
    *F02C 9/40* (2006.01)
    *F02C 3/22* (2006.01)

(52) U.S. Cl.
    CPC . *F02C 9/40* (2013.01); *F23R 3/343* (2013.01); *F23R 3/346* (2013.01); *F23R 3/36* (2013.01); *F23R 3/46* (2013.01); *F23C 2900/9901* (2013.01); *F23D 2900/00015* (2013.01); *F23R 2900/00002* (2013.01)

(56) References Cited

U.S. PATENT DOCUMENTS

| | | | |
|---|---|---|---|
| 8,656,721 | B2 | 2/2014 | Matsumoto et al. |
| 2007/0089419 | A1 | 4/2007 | Matsumoto et al. |
| 2010/0095649 | A1* | 4/2010 | Blouch ............ F02C 7/22 60/39.463 |
| 2010/0170251 | A1 | 7/2010 | Davis, Jr. et al. |
| 2010/0229557 | A1 | 9/2010 | Matsumoto et al. |
| 2011/0094239 | A1 | 4/2011 | Koizumi et al. |
| 2011/0101131 | A1 | 5/2011 | Milosavljevic et al. |
| 2011/0185703 | A1 | 8/2011 | Dodo et al. |
| 2013/0224672 | A1 | 8/2013 | Carroni et al. |
| 2013/0283801 | A1 | 10/2013 | Romig et al. |
| 2013/0306181 | A1* | 11/2013 | Mitchell ............ F23L 15/04 137/888 |
| 2014/0182294 | A1 | 7/2014 | Matsumoto et al. |
| 2014/0260309 | A1* | 9/2014 | Menon ............... F23R 3/36 60/780 |
| 2015/0275755 | A1* | 10/2015 | Ogata ............... F02C 3/22 60/39.463 |
| 2015/0362194 | A1 | 12/2015 | Ogata et al. |

FOREIGN PATENT DOCUMENTS

| | | | |
|---|---|---|---|
| EP | 0 831 205 | A2 | 3/1998 |
| EP | 2657611 | A2 | 10/2013 |
| EP | 2733425 | A1 | 5/2014 |
| JP | 4340020 | A | 11/1992 |
| JP | 07-119491 | A | 5/1995 |
| JP | 8210641 | A | 8/1996 |
| JP | 9159143 | A | 6/1997 |
| JP | 11-072009 | A | 3/1999 |
| JP | 2002-61517 | A | 2/2002 |
| JP | 2005344981 | A | 12/2005 |
| JP | 2006-10193 | A | 1/2006 |
| JP | 2007-113888 | A | 5/2007 |
| JP | 200952768 | A | 3/2009 |
| JP | 2010-096488 | A | 4/2010 |
| JP | 2010-174767 | A | 8/2010 |
| JP | 2010-216668 | A | 9/2010 |
| JP | 2011-075174 | A | 4/2011 |
| JP | 201189435 | A | 5/2011 |
| JP | 2011144972 | A | 7/2011 |
| JP | 2012-141078 | A | 7/2012 |
| WO | 2013/043076 | A1 | 3/2013 |
| WO | 2014/092185 | A1 | 6/2014 |

OTHER PUBLICATIONS

Communication dated May 26, 2015, issued by the Japanese Patent Office in counterpart Japanese application No. 2015-508912.
International Search Report for PCT/JP2014/065657 dated Sep. 16, 2014.
Written Opinion for PCT/JP2014/065657 dated Sep. 16, 2014.
Communication dated Oct. 2, 2015, issued by the European Patent Office in corresponding European Application No. 15168221.8.
Communication dated Sep. 7, 2015, issued by the European Patent Office in corresponding European Application No. 14844741.0.
Communication dated Oct. 1, 2015 from the Canadian Intellectual Property Office in counterpart application No. 2,885,287.
Communication dated Feb. 23, 2016, issued by the Japan Patent Office in corresponding Japanese Application No. 2015-026716.
Communication dated Dec. 17, 2015, issued by the U.S. Patent and Trademark Office in corresponding U.S. Appl. No. 14/620,874.
Communication dated Dec. 18, 2015, issued by the U.S. Patent and Trademark Office in corresponding U.S. Appl. No. 14/736,571.
Communication dated Dec. 21, 2015, issued by the Intellectual Property Office of the P.R.C. in corresponding Chinese Application No. 201380065296.9.
Communication from the United States Patent and Trademark Office issued Mar. 29, 2016 in U.S. Appl. No. 14/620,874.
Communication from the United States Patent and Trademark Office issued Apr. 7, 2016 in U.S. Appl. No. 14/736,571.
Communication dated Apr. 12, 2016, from the Japanese Patent Office in counterpart application No. 2014-552101.

* cited by examiner

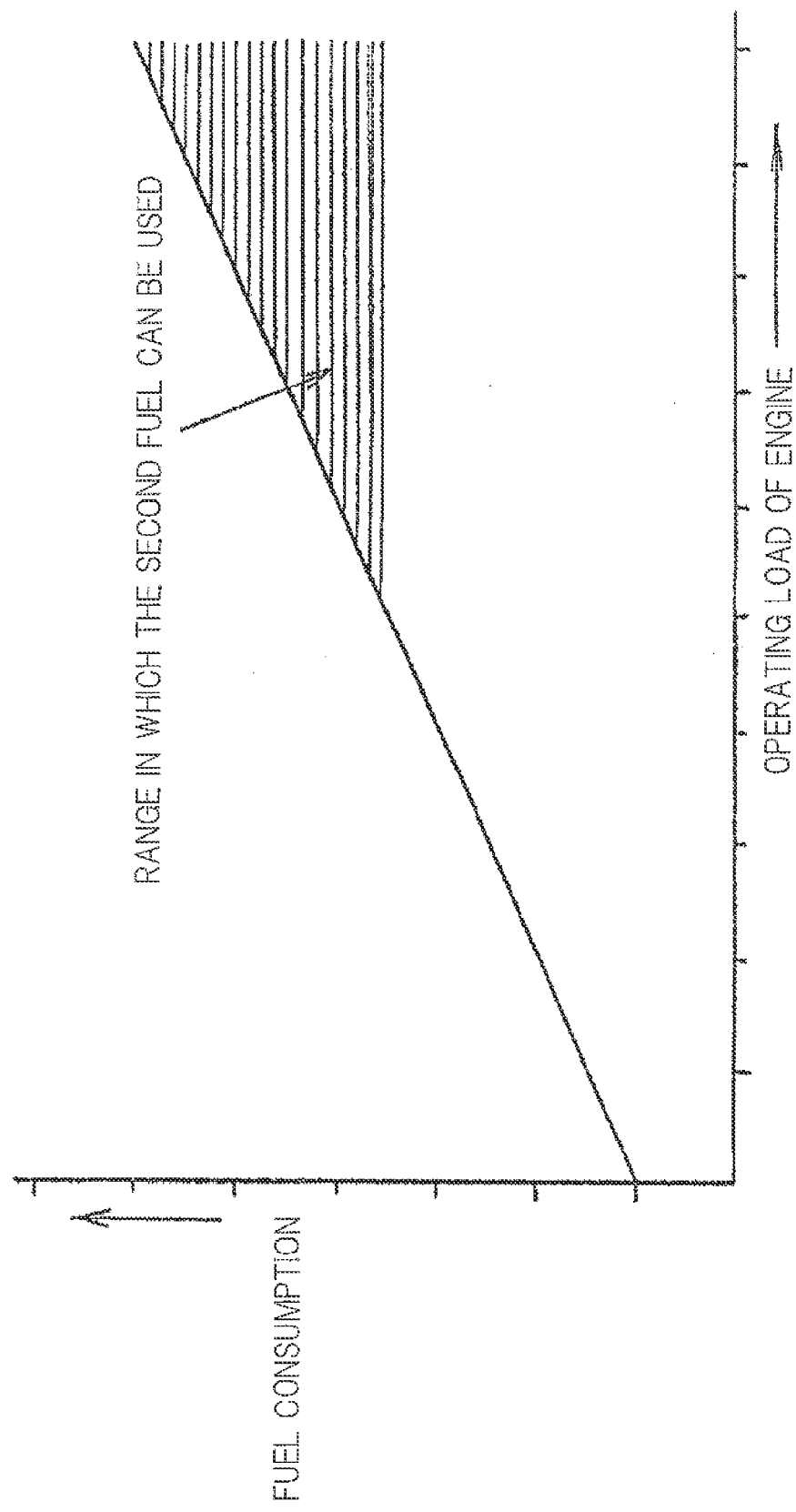

MULTIFUEL GAS TURBINE COMBUSTOR

CROSS REFERENCE TO RELATED APPLICATIONS

This application is a National Stage Entry of International Application No. PCT/JP2014/065657 filed Jun. 12, 2014, the contents of all of which are incorporated herein by reference in their entirety.

BACKGROUND OF THE INVENTION

1. Field of the Invention

The present invention relates to a multifuel gas turbine combustor operable with the efficient utilization of hydrogen containing fuel while securing a low emission performance.

2. Description of Related Art

In the field of combustors in gas turbine engines, a technology for securing a low emission performance including a low NOx emission has hitherto been known, which includes, besides a wet type combustor, in which water or steam is injected into the combustor, a dry low emission (DLE) combustor in which a pre-mixture formed by mixing fuel with compressed air is injected into a combustion chamber to accomplish a leaned pre-mixture combustion, that is, a lean burn of the pre-mixture. This dry low emission combustor makes use of hydrocarbon system fuel such as, for example, natural gas, kerosene or diesel oil as a fuel for use in the dry low emission combustor.

In the meantime, in recent years, the efficient utilization of the hydrogen gas emitted in chemical plants as a fuel for use in the gas turbine combustor is desired for. As a gas turbine combustor utilizing the hydrogen gas as a fuel therefor, such a combustor as disclosed in the patent document 1 listed below has been known in the art.

PRIOR ART LITERATURE

Patent Document 1: JP Laid-open Patent Publication No. 2011-075174

Gas such as, for example, hydrogen gas is generally high in combustion velocity as compared with that of the previously mentioned hydrocarbon system fuel. Accordingly, if a substantial amount of the hydrogen gas is mixed in the fuel for the dry low emission combustor, there is a possibility that the back firing phenomenon may occur in which flames propagate through a relatively long premixing passage to such an extent as to result in heating and/or impairment. In contrast thereto, the patent document 1 referred to above discloses the utilization of the diffusive combustion to minimize the risk of back firing phenomenon while the hydrogen gas is used as a fuel therefor. In other words, the patent document 1 referred to above discloses a technique that is remotely far from the leaned pre-mixture combustion.

SUMMARY OF THE INVENTION

In view of the foregoing, the present invention has for its primary object to provide a multifuel gas turbine combustor, that is, a gas turbine combustor capable of operating with multifuel pre-mixture, which can combust gases containing hydrogen in a high concentration with a low NOx while maintaining a low emission performance brought about by the pre-mixture combustion.

In order to accomplish the foregoing object of the present invention, the present invention provides a multifuel gas turbine combustor which includes a main burner to supply a premixed gas, containing a first fuel, to a first combustion region within a combustion chamber and then to combust the premixed gas, and a supplemental burner to supply a premixed gas, containing a second fuel of a composition different from that of the first fuel, to a second combustion region at a location downstream of the first combustion region within the combustion chamber and then to combust the premixed gas. In this gas turbine compressor, the first fuel is of a hydrocarbon system and the second fuel is a gas containing hydrogen in concentration exceeding a stable combustion limiting concentration of the hydrogen. It is to be noted that the term "hydrocarbon system" referred to above and hereinafter means a gas containing hydrocarbons in a quantity equal to or higher than 60 percents by volume with the hydrogen gas not higher than the stable combustion limiting concentration, or a liquid containing hydrocarbons in a quantity equal to or higher than 60 percents by volume. It is also to be noted that the stable combustion limiting concentration of hydrogen referred to above and hereinafter stands for the hydrogen concentration (volume %) at the upper limit of the boundary of whether the stable combustion is impaired as a result of the occurrence of a backfiring or is maintained when a premix containing hydrogen is formed within a main burner including a flame holding mechanism and a swirler. This stable combustion limiting concentration of the hydrogen is generally within the range of 8 to 15 percents by volume, but about 10 percents by weight in the embodiments of the present invention.

In this gas turbine combustor, since the first fuel of the hydrocarbon system, which is relatively low in combustion velocity, is supplied to the main burner for supplying and combusting the premixed gas in the first combustion region, there is no risk of backfiring occurring and, therefore, a good low emission performance can be maintained. On the other hand, where the operating range is expanded towards a high output side in dependence the increase of an engine load, the premixed gas, in which the air is mixed into the second fuel, is supplied from the supplemental burner and combusted in the second combustion region and, therefore, the second furl containing the hydrogen gas, which is high in combustion velocity, can be combusted at a low combustion temperature by the introduction of the air. As a result, the hydrogen gas generally tending to emit a large emission of NOx can be combusted at a low NOx, that is, at a low emission. It is further to be noted that the term "composition different" means that the difference exists in content of the principal component or element. In addition, since the supplemental burner is activated while a high temperature combustion gas is generated upon substantial completion of combustion in the main burner, the combustion reaction of the premixed gas injected from the supplemental burner is stably accelerated in the presence of the high temperature combustion gas without the flame holding mechanism employed. By this reason, even when as the second fuel the gas containing the hydrogen exceeding the stable combustion limiting concentration is used, there is no risk of the backfiring occurring.

In a preferred embodiment of the present invention, the supplemental burner may be a premixing burner operable to premix both of the first fuel and the second fuel with an air and supplying it to the second combustion region. The use of the premixing burner for the supplemental burner makes it possible that in the event of shortage of one of the first fuel and the second fuel, mixing an air into one of the first and second fuels, which is sufficient in quantity, and then supplying it into the second combustion region is satisfactory. For example, where the second fuel is employed in the form of a by-product hydrogen gas, which is generated in a chemical plant, in the event of the shortage of the second fuel by reason of the operation of the chemical plant being halted, a required high output operation can be maintained by supplying the first fuel from the supplemental burner into the second combustion region.

In another preferred embodiment of the present invention, where both of the first and second fuels are supplied to the supplemental burner, the supplemental burner may include a premixing chamber to which the air is introduced, a first nozzle to inject the first fuel into the premixing chamber, and a second nozzle to inject the second fuel into the premixing chamber. By so doing, in the premixing chamber, the first fuel, injected from the first nozzle, and the second fuel, injected from the second nozzle, are sufficiently mixed with the air then introduced into the premixing chamber to provide a good premixed gas, which premixed gas is supplied to the second combustion region.

Similarly where both of the first and second fuels are supplied to the supplemental burner, the supplemental burner may include a mixing chamber to which the first fuel and the second fuel are introduced, and the premixing chamber to premix the mixed fuel with the air. By so doing, after the first fuel and the second fuel have been introduced into and premixed together within the mixing chamber, the mixed fuel is introduced into the premixing chamber and is then premixed with the air. Therefore, the premixed gas containing the first fuel, the second fuel and the air uniformly distributed over the entirety can be generated.

Furthermore where both of the first and second fuels are supplied to the supplemental burner, the supplemental burner may include a first burner to premix the first fuel with the air and then to inject it, and a second burner to premix the second fuel with the air and then to inject it. By so doing, the structure of each of the first burner and the second burner can be simplified.

In a further preferred embodiment of the present invention, particularly where both of the first and second fuels are supplied to the supplemental burner, the gas turbine combustor of the present invention may further include a main fuel supply passage to supply the first fuel to the main burner, a first fuel control valve provided in the main fuel supply passage, and a first reheating fuel supply passage to supply the first fuel to the supplemental burner, the first reheating fuel supply passage being branched off from an upstream side of the first fuel control valve in the main fuel supply passage. According to this structural feature, regardless of the variation in pressure inside the main fuel supply passage resulting from the adjustment of the first fuel control valve, the required quantity of the first fuel can be supplied stably at all times to the supplemental burner.

In a still further preferred embodiment of the present invention, the gas turbine combustor may further include a pilot burner to inject the first fuel into the first combustion region and then to accomplish a diffusion combustion thereof, and a pilot sub passage disposed in a pilot fuel supply passage to supply the first fuel to the pilot burner to introduce the second fuel during activation of the main burner. According to this structural feature, since the second fuel containing the hydrogen gas is supplied to the pilot burner of a diffusion combustion system, the combustion within the pilot burner can be stabilized by the hydrogen gas that is high in combustion temperature.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4 is a characteristic chart showing the relationship between a load variation in the gas turbine engine and the fuel consumption of a second fuel corresponding therewith;

DESCRIPTION OF PREFERRED EMBODIMENTS

Figure 1:
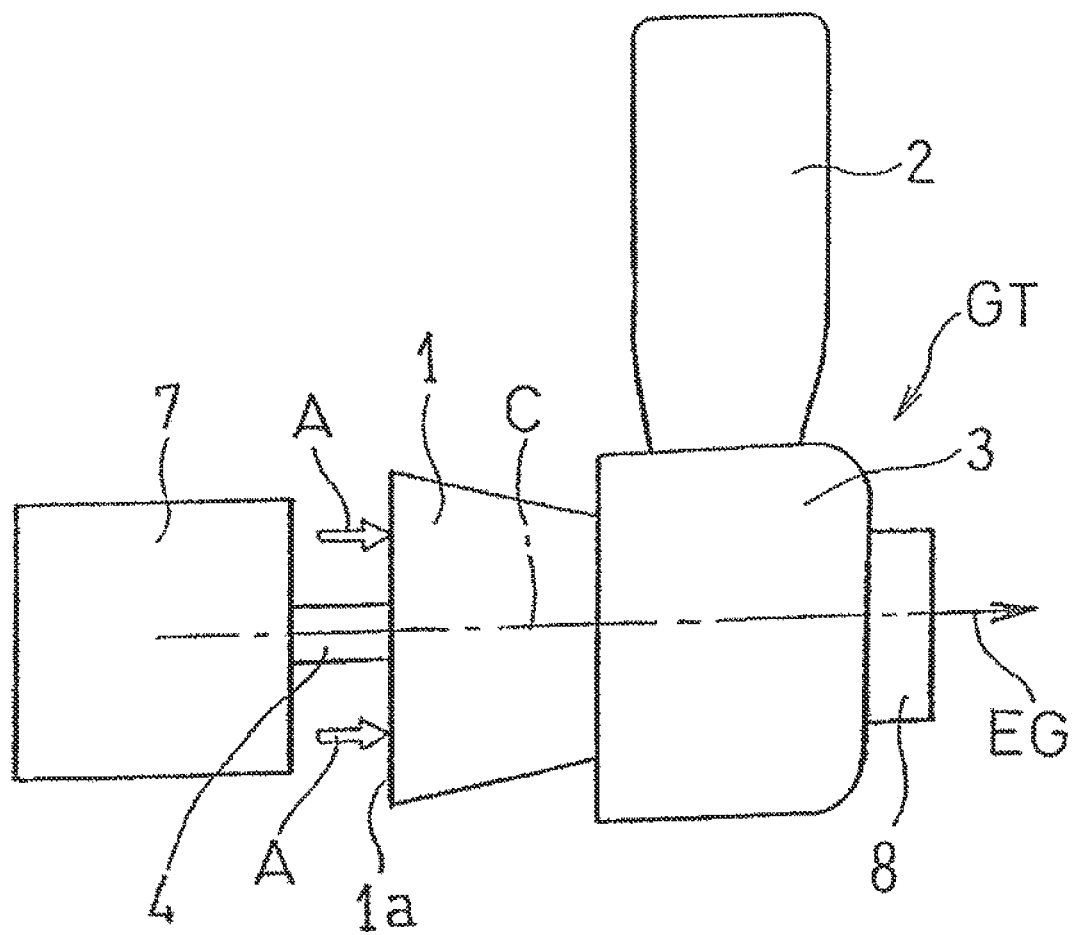
FIG. 1 is a schematic structural diagram showing a gas turbine engine to which a gas turbine combustor of the present invention is applied.

Hereinafter, some preferred embodiments of the present invention will be described in detail with particular reference to the accompanying drawings. It is, however, to be noted that in the practice of the embodiments of the present invention, a gas turbine engine GT to which a gas turbine combustor is applied is of a single can type as shown in FIG. 1, but it may be of a multi-can type. This gas turbine engine GT includes a centrifugal compressor 1 for compressing an air A which has been sucked from an air inflow port 1a, a combustor 2 for supplying a fuel into a compressed air A to burn them, and a turbine 3 driven by a combustion gas from the combustor 2. The combustor 2 is disposed so as to protrude in a substantially radial direction with respect to an engine rotary shaft axis C. The combustion gas generated by the combustor 2 is guided into the turbine 3 to rotate the turbine 3 to thereby drive the centrifugal compressor 1, drivingly connected with the turbine 3 through a rotary shaft 4, and a load 7 such as an electric power generator. Exhaust gases EG having passed through the turbine 3 are discharged to the outside through an exhaust discharge duct 8.

Figure 2:
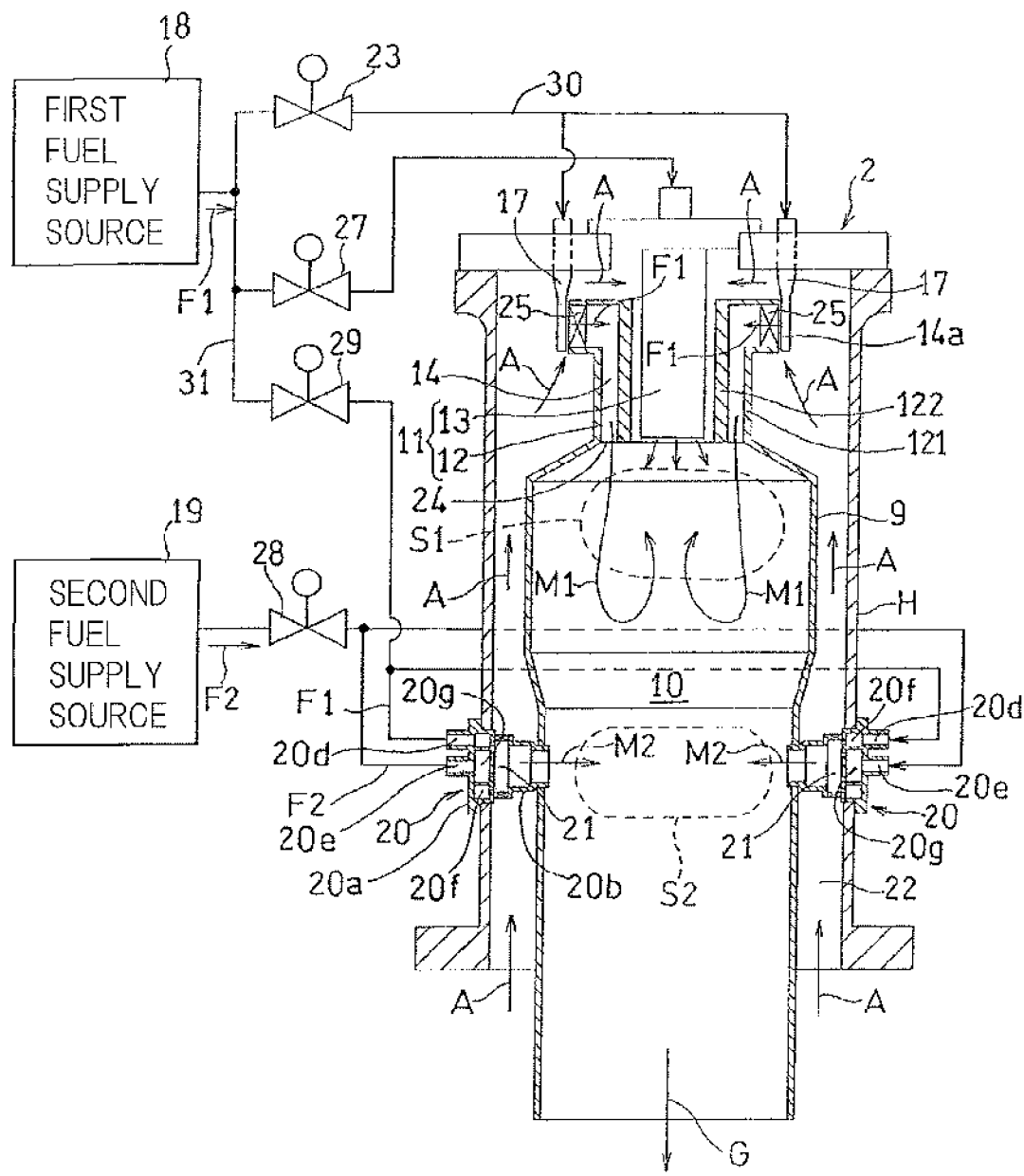
FIG. 2 is a schematic longitudinal sectional view showing the gas turbine combustor, designed in accordance with a first preferred embodiment of the present invention, shown together with a fuel supply system therefor.

As shown in FIG. 2, the combustor 2 is of a reverse flow can type in which the compressed air A, guided from the centrifugal compressor 1 (best shown in FIG. 1) into an air passage 22, and the combustion gas G flow within the combustor 2 in respective directions reverse to each other. The combustor 2 includes a cylindrical housing H and a substantially cylindrical combustion barrel 9 accommodated within the housing H in coaxial relation therewith. The air passage 22 into which the air A is introduced from the centrifugal compressor 1 is formed between the housing H and the combustion barrel 9, and a combustion chamber 10 is formed within the combustion barrel 9. A burner unit (nozzle unit) 11 is fitted to the top of the combustion barrel 9.

The burner unit 11 makes use of, as a first fuel F1, a hydrocarbon system fuel containing 60 or higher percents by volume of hydrocarbon. In the practice of the embodiment, this hydrocarbon system fuel is in the form of natural gas. The hydrocarbon system fuel includes, besides the natural gas, a gaseous fuel in which the natural gas is mixed with about 5% of hydrogen, and a liquid fuel such as, for example, kerosene or diesel oil. The burner unit 11 includes a main burner 12 and a pilot burner 13. The main burner 12 combusts a premixed gas or premixed air-fuel mixture M which contains the first fuel F1 for premixing purpose, supplied from a first fuel supply source 18, after the premixed gas M1 has been injected into a first combustion region S1, within the combustion chamber 10. The pilot burner 13 diffusively combusts the first fuel F1 after the latter has been injected directly into the first combustion region S1.

Also, the combustion barrel 9 includes a supplemental burner 20 for accomplishing combustion by premixing with an air A both of a second fuel F2 for reheating purpose, supplied from a second fuel supply source 19, and the first fuel F1 from the first fuel supply source 18, and then injecting such a premixed gas into a second combustion region S2 downstream of the first combustion region S1 within the combustion chamber 10. The supplemental burner 20 is provided in a plural number and, while those of supplemental burners 20 are disposed spaced an equal distance from each other in a direction circumferentially of the combustion barrel 9, each of them traverses the air passage 22 delimited between the housing H and the combustion barrel 9. For the second fuel F2, a gas of a composition different from that of the first fuel F1, but containing hydrogen in a concentration exceeding the stable combustion limiting concentration, for example, in a concentration exceeding 10 vol. % is employed. The hydrogen concentration in the second fuel F2 is preferably 20 vol. % or higher and, more preferably, 30 vol. % or higher. This hydrogen containing gas is in the form of, for example, a gas containing solely a hydrogen gas (100 vol. %), or a gas in which hydrogen gas is mixed with a methane gas or propane gas or an inactive gas such as nitrogen.

The main burner 12 referred to above is disposed so as to enclose the outer periphery of the pilot burner 13 of a cylindrical shape. This main burner 12 includes an L-sectioned annular outer wall 121 and an annular inner wall 122, with a premixing passage 14 delimited between the outer wall 121 and the inner wall 122. The premixing passage 14 has an upstream end open radially outwardly and, at allocation radially outwardly of an annular air intake opening 14a so opened, a plurality of main fuel nozzles 17 are disposed spaced an equal distance from each other in a direction circumferentially of the main burner 12. Respective portions of the main fuel nozzles 17, which confront the air intake opening 14a, are formed with a plurality of fuel injection holes (not shown) through which the first fuel F1 is injected towards the air intake opening 14a. In the air intake opening 14a, a swirler 25 is disposed for promoting the premixing of the first fuel F1 by swirling an inflowing air. The pilot burner 13 of a diffusive combustion type is disposed within an inner space of the inner wall 122.

Figure 3A:
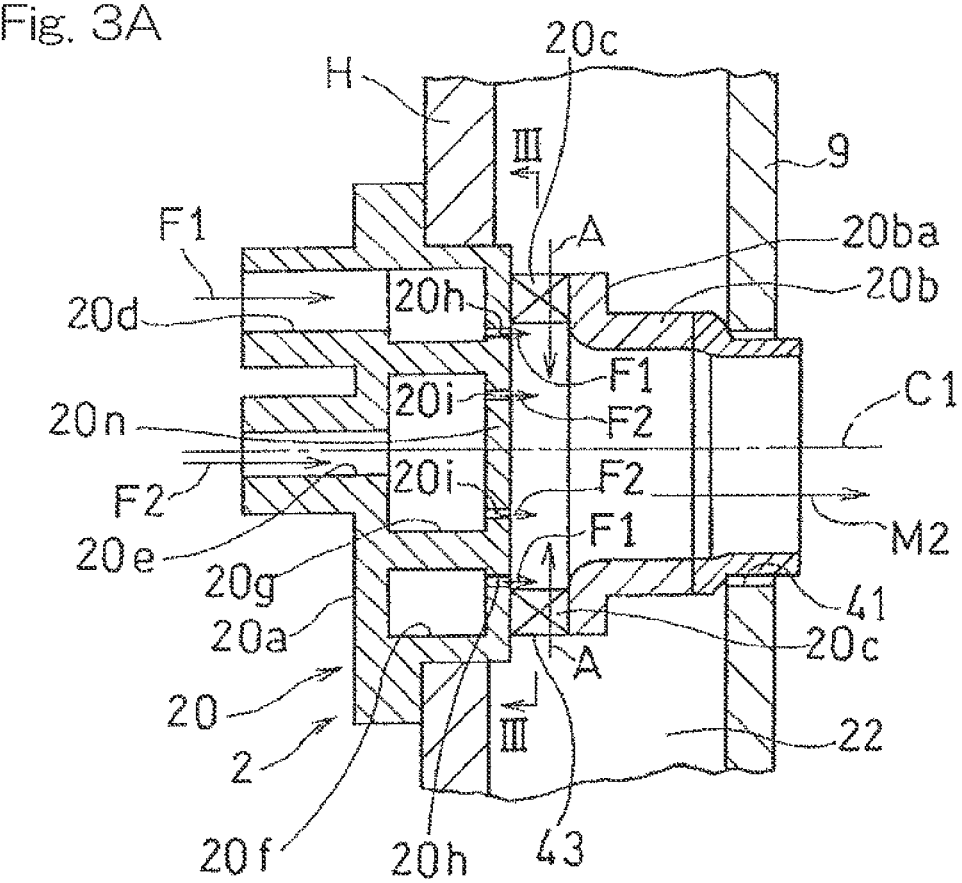
FIG. 3A is a fragmentary enlarged diagram showing a portion of FIG. 2.

As shown in FIG. 3A, the supplemental burner 20 referred to previously is of a structure in which, a fuel introducing block 20a and a collared mixture injecting barrel 20b are connected with each other through a plurality of guide pieces 20c, and is supported by the housing H by means of screwing (not shown) with a tip end of the mixture injecting barrel 20b inserted into an insertion hole 41, defined in the combustion barrel 9, so as to protrude into the combustion chamber 10. An air inflow opening 43 provided with the guide pieces 20c is formed between a collar 20ba of the mixture injecting barrel 20b and a bottom wall 20n of the fuel introducing block 20a. The air inflow opening 43 is communicated with a premixing chamber 21 defined by an inner peripheral surface of the mixture injecting barrel 20b and an outer surface of the bottom wall 20n.

The fuel introducing block 20a is provided with a first fuel introducing passage 20d for introducing the first fuel F1 from the first fuel supply source 18 from radially outwardly of the combustor 2, a second fuel introducing passage 20e for introducing the second fuel F2 from the second fuel supply source 19 from radially outwardly of the combustor 2, a first fuel chamber 20f of a cylindrical shape for reserving the first fuel F1 from the first fuel introducing passage 20d, and a second fuel chamber 20g of a cylindrical shape for reserving the second fuel F2 from the second introducing passage 20e. The fuel introducing block 20a also includes a first nozzle 20h in the form of a plurality of small perforations, through which the first fuel F1 within the first fuel chamber 20f is injected into the premixing chamber 21, and a second nozzle 20i in the form of a plurality of small perforations through which the second fuel F2 within the second fuel chamber 20g is injected into the premixing chamber 21.

Figure 3B:
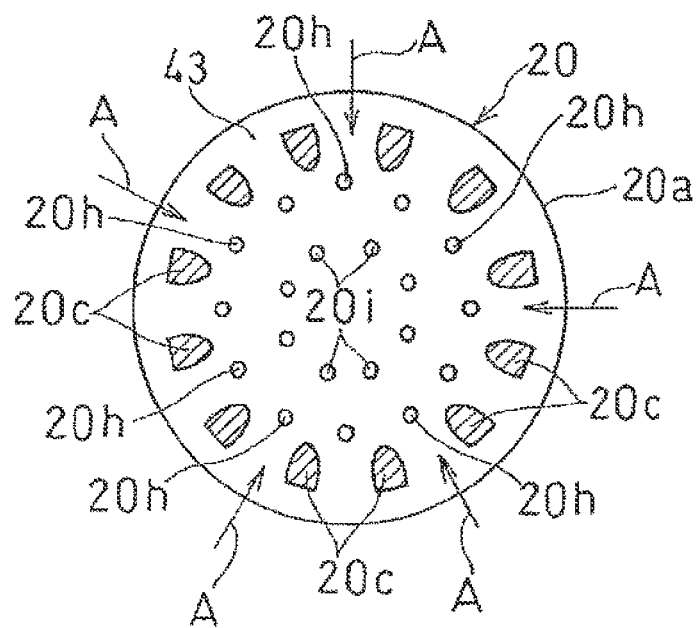
FIG. 3B is a cross sectional view taken along the line III-III in FIG. 3A.

As shown in FIG. 3B, the guide pieces 20c, which is 12 in number, for example, in the illustrated embodiment, are provided in the vicinity of an outer peripheral edge of the fuel introducing block 20a in a fashion spaced an equal distance from each other in the circumferential direction, while having been disposed coaxially with the cylindrical mixture injecting barrel 20b that is opposed relative to the fuel introducing block 20a. The first nozzle 20h formed in the fuel introducing block 20a is positioned at a location between the neighboring two guide pieces 20c and somewhat closer to the longitudinal axis C1 of the fuel introducing block 20a than to the guide piece 20c. Accordingly, from the first nozzle 20h, the first fuel F1 shown in FIG. 3A is injected towards the stream of the compressed air A introduced through an air inflow opening 43. From the second nozzle 20i, the second fuel F2 is sprayed towards a center portion of the premixing chamber 21 in a direction parallel to the longitudinal axis C1. Accordingly, a smooth mixing of the first fuel F1 and the second fuel F2 with the compressed air A is accelerated. Since the compressed air A introduced through the air inflow opening 43 is deflected 90° after having passed through the guide piece 20c, a turbulent flow occurs so that the mixing of the first fuel F1 and the second fuel F2 is accelerated.

Hereinafter, the operation will be described. The first fuel F1 supplied from the first fuel supply source 18 shown in FIG. 2 is, after the flow rate thereof has been adjusted by a first fuel control valve 23, injected from the main fuel nozzle 17 into the air intake opening 14a of the premixing passage 14. The first fuel F1 so injected is introduced into the premixing passage 14 together with the compressed air A then flowing from the air passage 22 into the air intake opening 14a while having been swirled by the swirler 25. The first fuel F1 is premixed with the compressed air A while flowing within the premixing passage 14, and is finally injected into the combustion chamber 10 as a premixed gas M1 from an annular premix jetting port 24.

At the time the gas turbine engine GT is started, the first fuel control valve 23 is closed, but only a second fuel control valve 27 is opened. Under this condition, the first fuel F1 in the first fuel supply source 18 is injected from the pilot burner 13 into the combustion chamber 10 by way of the second fuel control valve 27 and the diffusive combustion takes place upon ignition of an ignition plug (not shown). During a normal operation, while the supply of the first fuel F1 from the pilot burner 13 is continued, with flames thereof used as a pilot fire, the premixed gas M1 injected from the main burner 12 into the combustion chamber 10 is premix-combusted and, at an upstream portion of the combustion chamber 10, the first combustion region S1 is formed. The main burner 12 and the pilot burner 13 are so controlled that the air to fuel ratio (air flow rate/fuel flow rate) may attain a predetermined value that is favorable to each of them.

This first combustion region S1 can reduce, for example, NOx and CO when the first fuel F1 is subjected to a leaned premix combustion (lean burn of the premix). Also, the first combustion region S1 does not accompany any backfiring because the first fuel F1 of the hydrocarbon system that is relatively low in combustion velocity is supplied to the main burner 12 for accomplishing the premix combustion. Therefore, in the first combustion region S1, a favorable low emission performance can be maintained.

On a downstream side of the first combustion region S1 in the combustion chamber 10, the second combustion region S2 for premix-combusting the premixed gas M2 injected from the supplemental burner 20 is formed. The supplemental burner 20 premixes both of the second fuel F2, which is supplied from the second fuel supply source 19 through a third fuel control valve 28, and the first fuel F1, which is supplied from the first fuel supply source 18 through a fourth control valve 29, with the compressed air A to form the premixed gas M2 which is in turn supplied to the second combustion region S2.

This second combustion region S2 is formed so that the operating range is expanded towards a high output side in dependence on variation of the operating load of the gas turbine engine GT. In the event that the increase of an operating load of the gas turbine engine GT exceeds a predetermined value, both of the third fuel control valve 28 and the fourth fuel control valve 29 are so adjusted as to open to the opening in dependence on the variation of the operating load so that a predetermined amount of the second fuel F2 and the first fuel F1 from the respective second and first fuel supply sources 19 and 18 can be supplied to the supplemental burner 20. As FIG. 4 makes it clear the fuel consumption of the second fuel F2 increases with the increase of the operating load of the engine GT, and therefore, a large quantity of the hydrogen gas, which is not sufficiently utilized at that time during a high load, can be consumed as the second fuel F2 for the combustor 2. In such case, regardless of whether the amount of supply of the second fuel F2 in the second combustion region S2 is large or small, the flame holding performance of the first combustion region S1 is secured by the main burner 12 and the pilot burner 13.

In the supplemental burner 20, the first fuel F1 and the second fuel F2 reserved respectively within the first combustion chamber 20f and the second combustion chamber 20g are, after having been injected from the first nozzle 20h and the second nozzle 20i into the premixing chamber 21 and mixed together, premixed with the compressed air A introduced into the premixing chamber 21 from the air passage 22 by way of the air inflow opening 43. Accordingly, within the premixing chamber 21, the first fuel F1 and the second fuel F2 are sufficiently mixed with the compressed air A, then introduced from the air passage 22, to thereby form a good premixed gas M2. This premixed gas M2 is supplied from the mixture injecting barrel 20b to the second combustion region S2 within the combustion barrel 9 and is then premix-combusted.

Here, where only the second fuel F2 is supplied to the supplemental burner 20, as a result that the second fuel F2 containing the hydrogen gas having a high combustion velocity is combusted at a low combustion temperature by the introduction of the compressed air A, the hydrogen gas, which is generally responsible to the generation of a large quantity of NOx, can be combusted at a low NOx. Also, the supplemental burner 20 is activated under a condition in which a high temperature combustion gas G is generated as a result of general completion of combustion by the main burner 12 and the pilot burner 13, and therefore, the premixed gas M2 injected from the supplemental burner 20 has its combustion reaction accelerated stably by the high temperature combustion gas G with no flame holding mechanism. By those reasons, there is no risk of backfiring even when a fuel such as, for example, hydrogen is used as the second fuel F2.

In this combustor 2, in the event of shortage of the second fuel F2, the first fuel F1 is added. For example, where a by-product hydrogen gas, which is generated in a chemical plant, is used as the second fuel F2, in the event of shortage of this second fuel F2 as a result of the halt of operation of the chemical plant, it is possible to maintain the required high output operation by opening the fourth fuel control valve 29 to supply the first fuel F1 of the first fuel supply source 18 from the supplemental burner 20 to the second combustion region S2.

In the meanwhile, it has been well known that the backfiring is generated starting at a relatively low speed site such as, for example, the boundary layer of a burner wall surface or a reverse flow area. As it has been made clear from the discussion made above, the supplemental burner 20 does not require any flame holding mechanism and do not make use of a flame holder or a swirler for generating the reverse flow area. Therefore, the resistance to the backfiring from the reverse flow area is extremely high. By reducing the fuel concentration in the vicinity of the boundary layer, that is, in the vicinity of the inner peripheral surface of the mixture injecting barrel 20b through the arrangement of the fuel jetting hole of the supplemental burner 20, the resistance to the backfiring from the boundary layer, which occurs in the vicinity of that inner surface, can be increased. For those reasons, in the supplemental burner 20 employed in the embodiment, while the leaned premix combustion system is employed, even the hydrogen gas having a relatively high concentration can be utilized as a fuel without the backfiring being accompanied.

Figure 5:
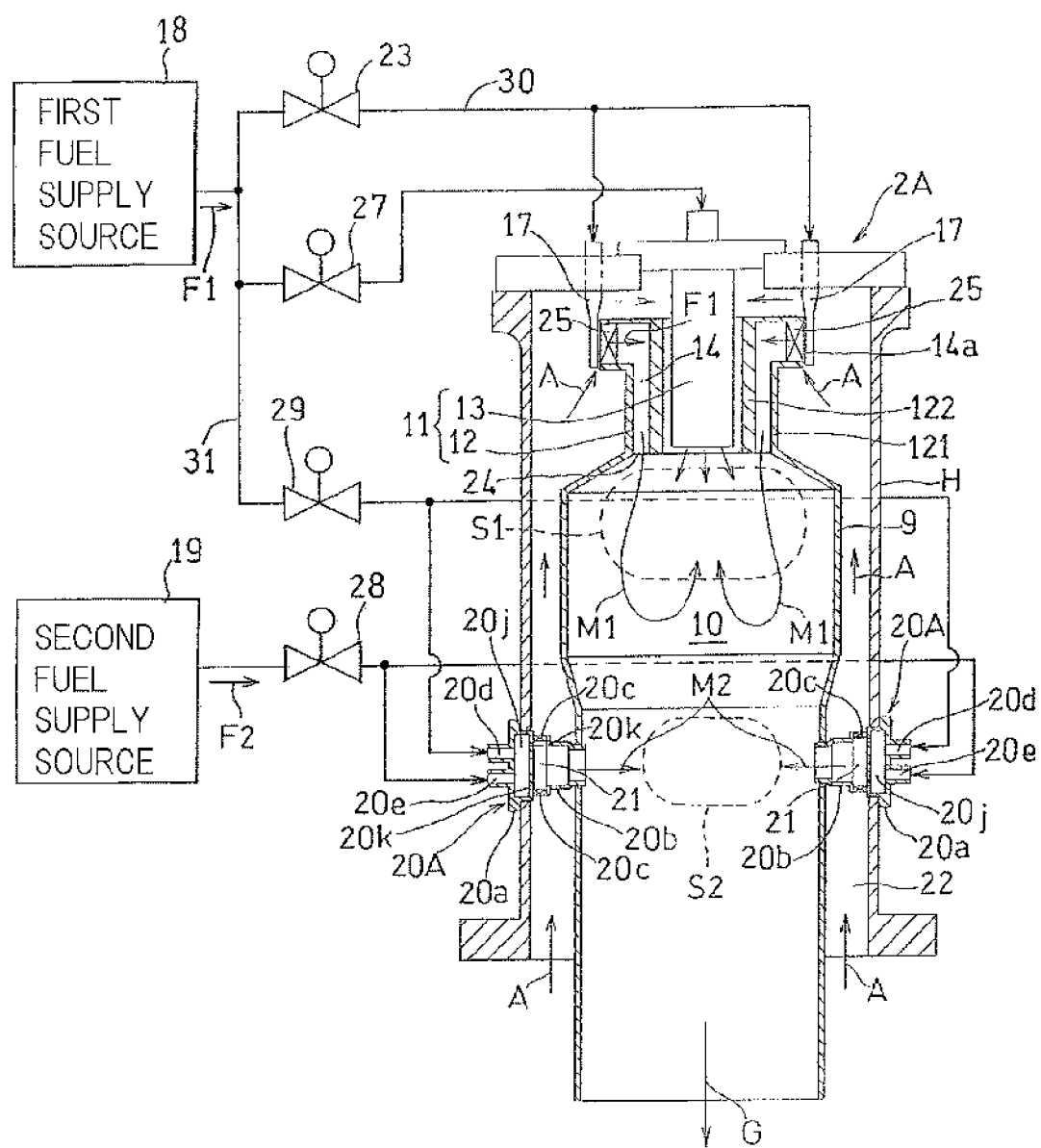
FIG. 5 is a schematic longitudinal sectional view showing the gas turbine combustor, designed in accordance with a second preferred embodiment of the present invention, shown together with a fuel supply system therefor.

The second preferred embodiment of the present invention is shown in FIG. 5. It is to be noted that in FIG. 5, components similar to those shown in FIG. 2 and described in connection with the previously described embodiment are designated by similar or identical reference numerals that are employed in FIG. 2 and, therefore, the details thereof are not reiterated for the sake of brevity. The gas turbine combustor 2A, employed in the practice of this second embodiment, differs from the gas turbine combustor 2, which is shown in FIG. 2 and has been described in connection with the first embodiment, in respect of the structure of the supplemental burner 20A. In other words, without reserving the first fuel F1 from the first fuel introducing passage 20d and the second fuel F2 from the second fuel introducing passage 20e, the first and second fuels F1 and F2 are directly introduced into a mixing chamber 20j to form a mixture fuel. The mixture fuel so formed is injected into the premixing chamber 21 through a third nozzle 20k, and is then premixed with the compressed air A introduced from the air passage 22 to form the premixed gas M2. The premixing chamber 21 is formed, in a manner similar to that employed in the practice of the first embodiment, between an inner surface of the mixture injecting barrel 20b and the bottom wall 20n of the fuel introducing block 20a, which are connected with each other with the plurality of the guide pieces 20c intervening therebetween.

In the supplemental burner 20 employed in the practice of the first embodiment, after the first fuel F1 and the second fuel F2 have been temporarily reserved respectively within the first fuel chamber 20f and the second fuel chamber 20g, the first fuel F1 and the second fuel F2 are injected into the premixing chamber 21, to which the compressed air A is introduced, to thereby form the premixed gas M. In contrast thereto, in the practice of this second embodiment, the first fuel F1 and the second fuel F2 are introduced into the mixing chamber 20j to form a mixture fuel beforehand and, subsequently, such mixture fuel is injected into the premixing chamber 21 to form the premixed gas M2. Accordingly, as a result of the mixture of the first and second fuels F1 and F2 having been accelerated, the premixed gas M2 that is further homogenous can be obtained.

Figure 6:
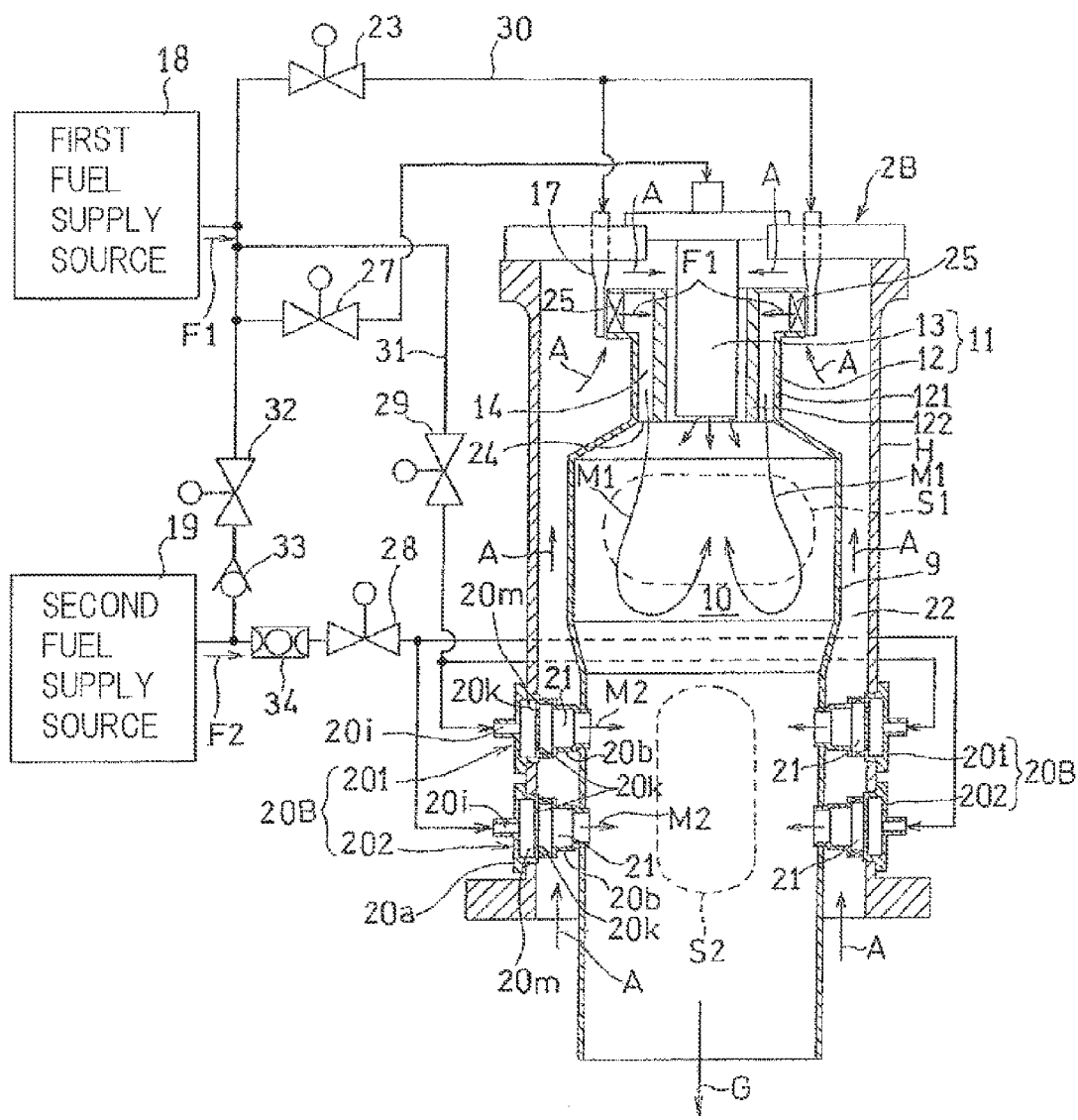
FIG. 6 is a schematic longitudinal sectional view showing the gas turbine combustor, designed in accordance with a third preferred embodiment of the present invention, shown together with a fuel supply system therefor.

FIG. 6 illustrates a third preferred embodiment of the present invention. It is to be noted that in FIG. 6, components similar to those shown in FIG. 2 and described in connection with the previously described embodiment are designated by similar or identical reference numerals that are employed in FIG. 2 and, therefore, the details thereof are not reiterated for the sake of brevity. The gas turbine combustor 2B, employed in the practice of this third embodiment, differs from the gas turbine combustor 2, which is shown in FIG. 2 and has been described in connection with the first embodiment, in respect of the structure in which the supplemental burner 20B shown in FIG. 6 is of a two staged arrangement using a first burner 201 and a second burner 202 that are separately provided for the first fuel F1 and the second fuel F2. The first burner 201 includes a fuel chamber 20m, into which the first fuel F1 is introduced from a single first fuel introducing passage 20i, and a premixing chamber 21 for premixing the first fuel F1 with the compressed air A, which first fuel F1 is introduced from the fuel chamber 20m through a third nozzle 20k.

The second burner 202 is also of an identical construction with the first burner 201 and the second fuel F2 is introduced into the fuel chamber 20m from a second fuel introducing passage 20i. The first fuel F1 is supplied to the first burner 201 through the fourth fuel control valve 29 and, also, the second fuel F2 is supplied to the second burner 202 through the third fuel control valve 28. A first reheating fuel supply passage 31 for the supply of the first fuel F1 is branched from an upstream side of the first fuel control valve 23 provided in a main fuel supply passage 30. Also, in this gas turbine combustor 2B, in the event of shortage of the second fuel F2, a fifth fuel control valve 32 is opened to supply the first fuel F1 of the first fuel supply source 18 towards a second fuel supply side through a check valve 33 so that the first fuel F1 is mixed by a mixer 34 with the second fuel F2 fed from the second fuel supply source 19 before the resultant mixture fuel is supplied to the second burner 202.

Since the gas turbine combustor 2B according to this third embodiment is such that the first reheating fuel supply passage 31 is fluid connected with the main fuel supply passage 30 at a location upstream of the first fuel control valve 23, it is possible to stably supply at all times a predetermined amount of the first fuel F1 to the supplemental burner 20B, regardless of pressure fluctuation within the main fuel supply passage 30 accompanied by an adjustment of the first fuel control valve 23.

Figure 7:
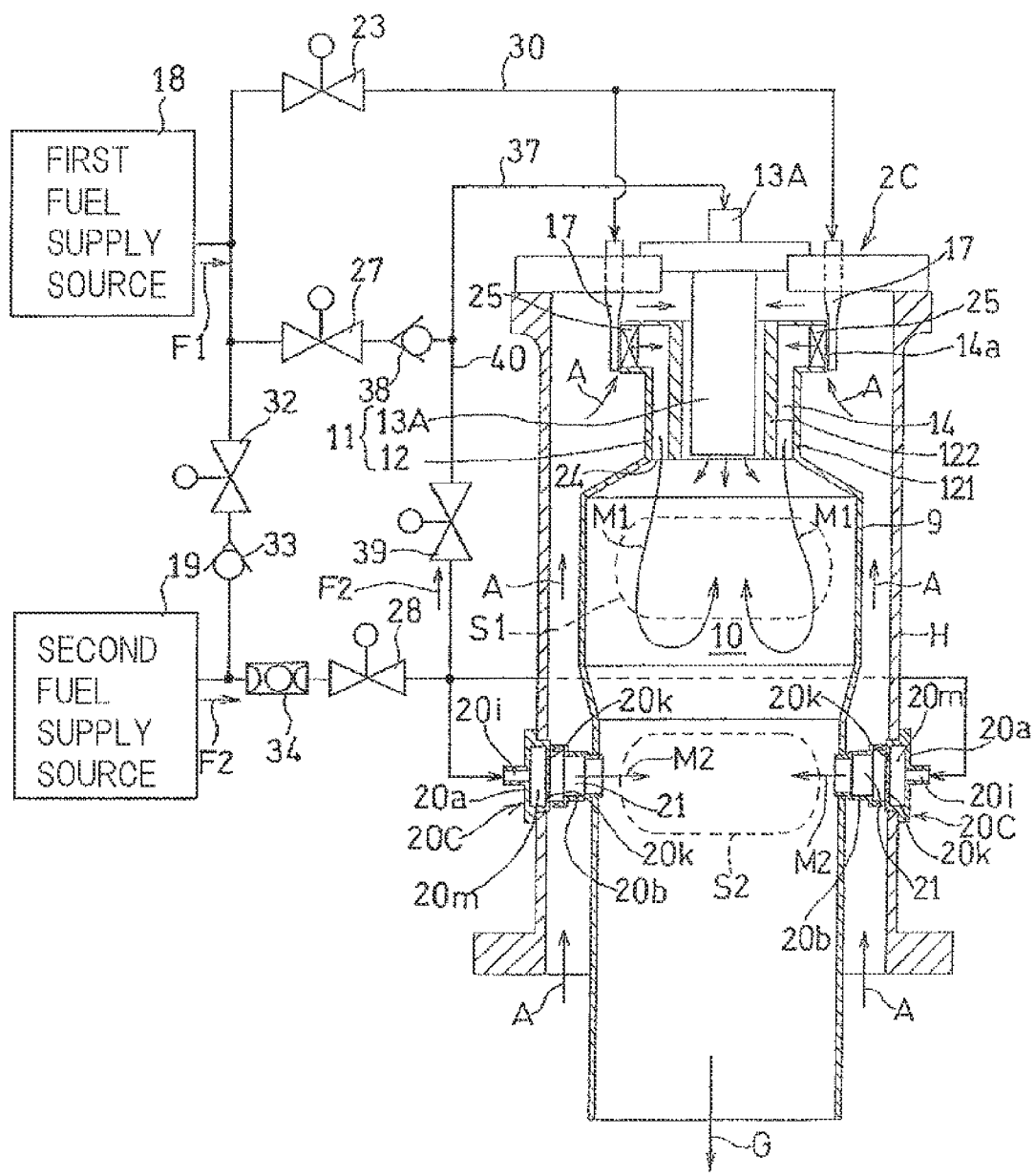
FIG. 7 is a schematic longitudinal sectional view showing the gas turbine combustor, designed in accordance with a fourth preferred embodiment of the present invention, shown together with a fuel supply system therefor.

A fourth preferred embodiment of the present invention is shown in FIG. 7. It is to be noted that in FIG. 7, components similar to those shown in FIG. 2 and described in connection with the previously described embodiment are designated by similar or identical reference numerals that are employed in FIG. 2 and, therefore, the details thereof are not reiterated for the sake of brevity. The gas turbine combustor 2C, employed in the practice of this fourth embodiment, includes a plurality of supplemental burners 20C of a single stage arrangement, which is of the structure identical with each of the first burner 201 and the second burner 202 that are employed in the practice of the third embodiment shown in FIG. 6, and also a pilot burner 13A capable of supplying the second fuel F2. The first fuel F1 is supplied to the pilot burner 13A through a pilot fuel supply passage 37 via the second fuel control valve 27 and a check valve 38. A pilot sub passage 40 for introducing the second fuel F2 through a sixth fuel control valve 39 during the activation of the main burner 12 is fluid connected with the pilot fuel supply passage 37. The check valve 38 is operable to permit only the flow of the first fuel F1 towards the pilot burner 13A and the supplemental burner 20B. It is to be noted that this gas turbine combustor 2C includes a fifth fuel control valve 32, a check valve and a mixer, which are equivalent to the fifth fuel control valve 32, the check valve 33 and the mixer 34, respectively, employed in the practice of the third embodiment shown in FIG. 6.

In the gas turbine combustor 2C according to this fourth embodiment, besides the supply of the first fuel F1 through the second fuel control valve 27 and the check valve 38, the second fuel F2 containing the hydrogen gas is supplied to the pilot burner 13A through the sixth fuel control valve 39. Therefore, combustion occurring in the pilot burner 13A is stabilized by the hydrogen gas having a high combustion temperature.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 2, 2A, 2B, 2C . . . Combustor
10 . . . Combustion chamber
12 . . . Main burner
13, 13A . . . Pilot burner
14 . . . Premixing passage
20, 20A, 20B . . . Supplemental burner
23 . . . First fuel control valve
30 . . . Main fuel supply passage
31 . . . First reheating fuel supply passage
37 . . . Pilot fuel supply passage
40 . . . Pilot sub passage
S1 . . . First combustion region
S2 . . . Second combustion region
201 . . . First burner 202 . . . Second burner
M1, M2 . . . Premixed gas

What is claimed is:

1. A gas turbine combustor which comprises:
   a main burner to supply a first premixed gas, containing a first fuel, to a first combustion region within a combustion chamber and then to combust the first premixed gas; and
   a supplemental burner to supply a second premixed gas, containing a second fuel of a composition different from that of the first fuel, to a second combustion region at a location downstream of the first combustion region within the combustion chamber and then to combust the second premixed gas;
   in which the first fuel is of a hydrocarbon system and the second fuel is a gas containing hydrogen in concentration exceeding a stable combustion limiting concentration of the hydrogen,
   in which the supplemental burner is a premixing burner operable to premix both of the first fuel and the second fuel with an air so as to provide the second premixed gas and to supply the second premixed gas to the second combustion region,
   in which the supplemental burner comprises a premixing chamber to which the air is introduced, a first nozzle to inject the first fuel into the premixing chamber, a second nozzle to inject the second fuel into the premixing chamber, a first fuel chamber to reserve the first fuel, and a second fuel chamber to reserve the second fuel, and
   in which the first nozzle is in the form of a plurality of small perforations, which open in the first fuel chamber, and the second nozzle is in the form of a plurality of small perforations which open in the second fuel chamber.

2. The gas turbine combustor as claimed in claim 1, further comprising:
   a main fuel supply passage to supply the first fuel to the main burner;
   a first fuel control valve provided in the main fuel supply passage; and
   a first reheating fuel supply passage to supply the first fuel to the supplemental burner, the first reheating fuel supply passage being branched off from an upstream side of the first fuel control valve in the main fuel supply passage.

3. The gas turbine combustor as claimed in claim 1, further comprising:
   a pilot burner to inject the first fuel into the first combustion region and then to accomplish a diffusion combustion thereof;
   a pilot fuel supply passage to supply the first fuel to the pilot burner; and
   a pilot sub passage to supply the second fuel into the pilot fuel supply passage during activation of the main burner.

4. The gas turbine combustor as claimed in claim 1, wherein:
   the supplemental burner includes a fuel introducing block and a collared mixture injecting barrel interconnected by a plurality of guide pieces, the fuel introducing block being provided with the first fuel chamber and the second fuel chamber;
   an air inflow opening is formed between a collar of the mixture injecting barrel and a bottom wall of the fuel introducing block, the air inflow opening being provided with the guide pieces; and
   the premixing chamber is defined by an inner peripheral surface of the mixture injecting barrel and an outer surface of the bottom wall, and the air inflow opening is communicated with the premixing chamber.

\* \* \* \* \*